United States Patent
Ortega Gutierrez et al.

(10) Patent No.: US 10,346,239 B1
(45) Date of Patent: Jul. 9, 2019

(54) PREDICTIVE FAILURE OF HARDWARE COMPONENTS

(71) Applicant: Amazon Technologies, Inc., Seattle, WA (US)

(72) Inventors: Felipe Enrique Ortega Gutierrez, Tacoma, WA (US); Gavin Akira Ebisuzaki, Issaquah, WA (US); Christopher James BeSerra, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 15/194,180

(22) Filed: Jun. 27, 2016

(51) Int. Cl.
*G06F 11/00* (2006.01)
*G01K 7/00* (2006.01)
*G06F 1/00* (2006.01)
*G06F 11/07* (2006.01)
*G06F 1/28* (2006.01)
*G06F 1/26* (2006.01)
*G01K 13/00* (2006.01)
*G06F 1/20* (2006.01)

(52) U.S. Cl.
CPC ............ *G06F 11/079* (2013.01); *G01K 7/00* (2013.01); *G01K 13/00* (2013.01); *G06F 1/266* (2013.01); *G06F 1/28* (2013.01); *G06F 11/0736* (2013.01); *G06F 11/0754* (2013.01); *G06F 1/20* (2013.01); *G06F 1/203* (2013.01); *G06F 1/206* (2013.01)

(58) Field of Classification Search
CPC ....... G06F 11/079; G06F 1/28; G06F 11/0736
See application file for complete search history.

(56) References Cited

U.S. PATENT DOCUMENTS

| | | | | |
|---|---|---|---|---|
| 5,140,394 A | * | 8/1992 | Cobb, III ............... | H02H 3/085 257/467 |
| 5,287,292 A | * | 2/1994 | Kenny .................... | G06F 1/206 702/132 |
| 5,422,806 A | * | 6/1995 | Chen ................... | G05B 13/0265 700/29 |

(Continued)

OTHER PUBLICATIONS

Chonko, "Using Forward Voltage to Measure Semiconductor Junction Temperature," Keithley Instruments, Inc., Feb. 2006, 3 pages.

*Primary Examiner* — Marc Duncan
*Assistant Examiner* — Jonathan D Gibson
(74) *Attorney, Agent, or Firm* — Klarquist Sparkman, LLP

(57) ABSTRACT

A system is described wherein power degradation can be used in conjunction with predictive failure analysis in order to accurately determine when a hardware component might fail. In one example, printed circuit boards (PCBs) can unexpectedly malfunction due to a variety of reasons including silicon power variation or air mover speed. Other hardware components can include silicon or an integrated circuit. In order to accurately monitor the hardware component, telemetry is used to automatically receive communications regarding measurements of data associated with the hardware component, such as power-related data or temperature data. The different temperature data can include junction temperature or ambient air temperature to determine an expected power usage. The actual power usage is then compared to the expected power usage to determine whether the hardware component can soon fail.

13 Claims, 10 Drawing Sheets

(56) References Cited

U.S. PATENT DOCUMENTS

| | | | | |
|---|---|---|---|---|
| 5,618,459 A * | 4/1997 | Kamiya | G05D 23/1912 | 165/80.2 |
| 5,712,802 A * | 1/1998 | Kumar | G05D 23/1917 | 257/712 |
| 6,203,191 B1 * | 3/2001 | Mongan | G01K 7/42 | 374/20 |
| 9,587,992 B1 * | 3/2017 | Cirit | G01K 7/01 | |
| 2002/0006027 A1 * | 1/2002 | Rodriguez | H05K 7/20909 | 361/688 |
| 2005/0192773 A1 * | 9/2005 | Sheng | G01K 7/42 | 702/132 |
| 2007/0061021 A1 * | 3/2007 | Cohen | G05B 13/026 | 700/30 |
| 2008/0180084 A1 * | 7/2008 | Dougherty | G11B 19/048 | 324/72 |
| 2009/0144568 A1 * | 6/2009 | Fung | G06F 1/3203 | 713/300 |
| 2010/0313204 A1 * | 12/2010 | Haugh | G06F 1/206 | 718/105 |
| 2011/0002358 A1 * | 1/2011 | Sato | G01K 1/026 | 374/163 |
| 2014/0163765 A1 * | 6/2014 | Jain | G06F 1/206 | 700/300 |
| 2014/0219071 A1 * | 8/2014 | Takata | G11B 19/048 | 369/53.1 |
| 2014/0369384 A1 * | 12/2014 | Weber | H03K 17/082 | 374/166 |
| 2015/0046685 A1 * | 2/2015 | Park | G06F 1/3243 | 712/220 |
| 2015/0067153 A1 * | 3/2015 | Bhattacharyya | H04L 43/04 | 709/224 |
| 2015/0323396 A1 * | 11/2015 | West | G01K 1/16 | 374/134 |
| 2016/0154690 A1 * | 6/2016 | Horrell | G06F 11/0751 | 714/57 |
| 2016/0356655 A1 * | 12/2016 | Tsurumaru | H01L 29/7395 | |

* cited by examiner

US 10,346,239 B1

PREDICTIVE FAILURE OF HARDWARE COMPONENTS

BACKGROUND

Predictive failure analysis (PFA) relates to analyzing trends to predict future failures. For example, predictive failure analysis can be used to evaluate a likelihood of failing hard disk drives. In one example, parameters, such as a flying height of a disk drive head, is analyzed and compared to known values to determine whether the drive is likely to fail.

PFA has been extended to determine an imminent failure of semiconductor devices, such as processors, memories, and other hardware logic. In semiconductors, junction temperature has been used to monitor operating conditions of a device. For example, a sensor can be placed adjacent to a device junction to measure junction temperature. An increase in junction temperature can suggest that the device will fail.

Accuracy has been an issue with PFA, especially in terms of an uncertainty in temperature measurement or voltage measurement. As a result, more accurate techniques are needed.

DETAILED DESCRIPTION

Figure 1:
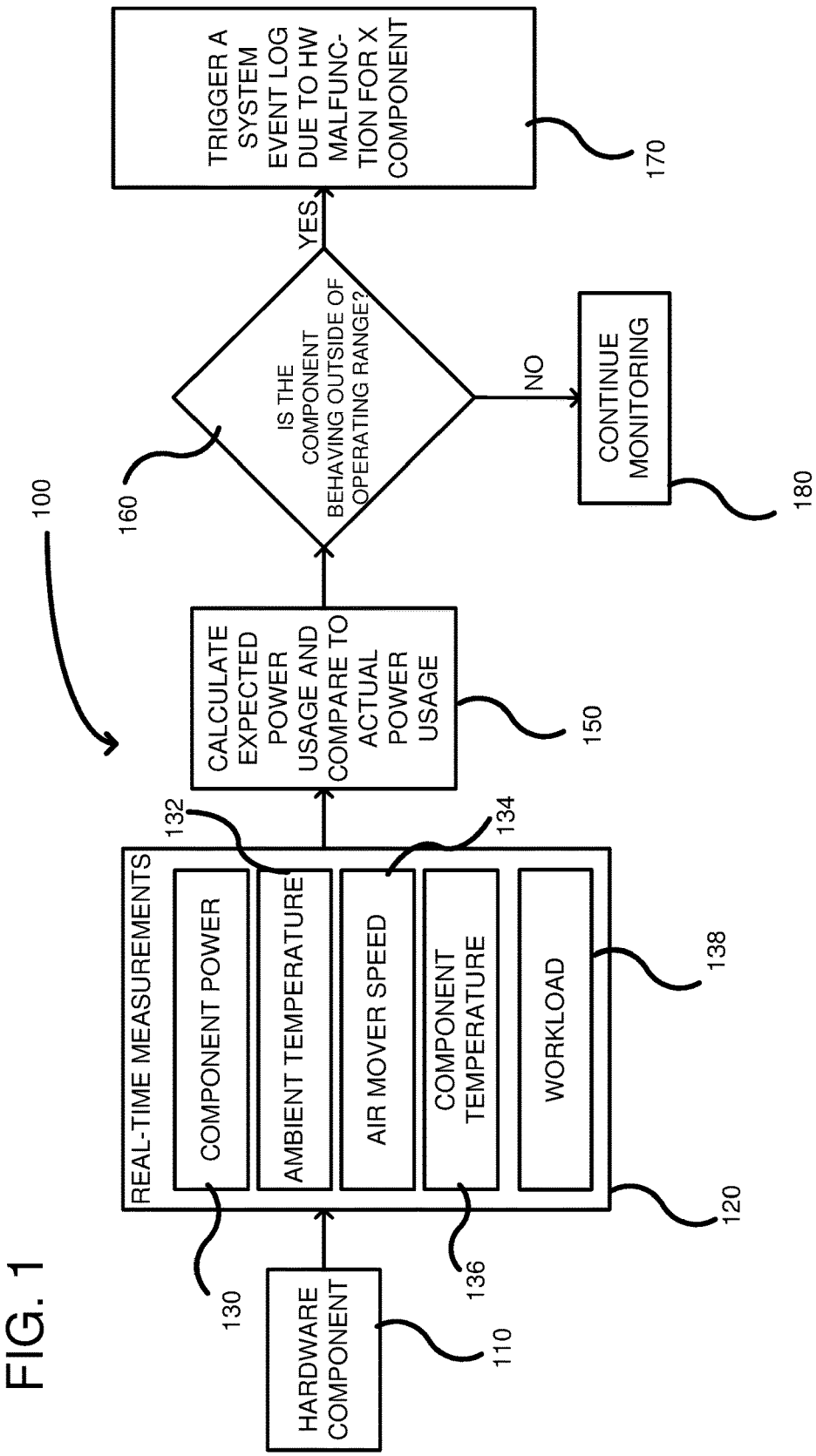
FIG. 1 shows a system diagram, wherein real-time power measurements, in addition to other parameters, are used for predictive failure analysis of a hardware component.

FIG. 1 is a system diagram 100 wherein power degradation can be used in conjunction with predictive failure analysis in order to accurately determine when a hardware component 110 might fail. In one example, printed circuit boards (PCBs) can unexpectedly malfunction due to a variety of reasons including silicon power variation or air mover speed (e.g., a fan, a blower, etc.). Other hardware components which can fail include silicon or an integrated circuit. Without accurate monitoring, it can take a significant amount of time to determine a root cause of a problem for failure.

In order to accurately monitor the hardware component 110, telemetry is used to automatically receive communications regarding measurements of data associated with the hardware component, such as power-related data or temperature data. The different temperature data can include junction temperature or ambient air temperature.

The following formula can be used to calculate an expected power:

$$P_{expected} = \frac{T_{junction\_meas} - T_{ambient\_meas}}{\Psi_{j-af(RPM)}} \pm P \%$$

The $P_{expected}$ value can be for various workloads [1-N] wherein various levels of utilization are obtained for power usage from low utilization to high utilization. Any in-between workload amounts can be interpolated based on measured amounts. This calculated $P_{expected}$ value can be compared against a measured power usage, which is provided by the component itself. $P_{expected}$ is the power that the hardware component should dissipate with the given parameters. The $T_{junction\_meas}$ is the measured junction temperature reported by the hardware component. $T_{ambient\_meas}$ is an ambient air temperature measured upstream of the component. This air temperature can be modified to be related to a flow temperature, such as either air or liquid flow temperature. The P % is a variation expected that is added such that $P_{expected}$ can have a range controlled by the P %.

The following portion of the formula is related to thermal resistance:

$$\Psi_{j-a} = A + B * RPM^{-C}$$

wherein the $\Psi_{j-a}$ is the thermal resistance of the hardware component in question as a function of air mover speed (revolutions per minute (RPM)). The A, B and C are constants that can be derived or modeled through testing, and depend on the particular design.

If $P_{meas}$ is greater than $P_{expected}+P \%$, then a system event is triggered indicating a potential degradation of the hardware component due to power exceeding an expected threshold. If the $P_{expected}-P \% <= P_{meas} <= P_{expected}+P \%$, then the management controller should continue monitoring and not take action. If the $P_{meas} < P_{expected}-P \%$, and $T_{junction\_meas} >$ upper threshold, then the management controller can log an event indicating a potential hardware malfunction.

In order to perform the above-described calculation, real-time measurements 120 are obtained from the hardware component 110 and other components (not shown) in the system 100. For example, power 130 associated with hardware component 110 is actual power being used by the component and can be obtained through a direct inquiry to the component. For example, the component can monitor voltage and/or current to determine the power being used. Another real-time measurement is ambient temperature 132, which is a temperature external to the component and generally upstream of the component. Air mover speed 134 is controlled by a management controller. Additionally, component temperature 136 is obtained from the component 110 itself. Finally, a workload 138 can be obtained. The workload can be based on a degree of utilization of the hardware component and can measured using computer usage per second (CUPS) measurements. Examples of computer usage measurements can include measuring traffic passing through the device in GB/second, operations per second, input/output per second, bus utilization per second, etc.

At 150, a management controller can calculate an expected power usage using the formula described above. Additionally, the management controller compares the expected power usage to an actual power usage. At decision block 160, a comparison is made using the power information to determine whether the hardware component 110 is acting outside a predetermined operating range. If so, then an event log is generated at 170 wherein the hardware component 110 is designated as predictively failing. Otherwise, at 180, the management controller continues to monitor the real-time measurements looking for measurements that appear problematic.

Figure 2:
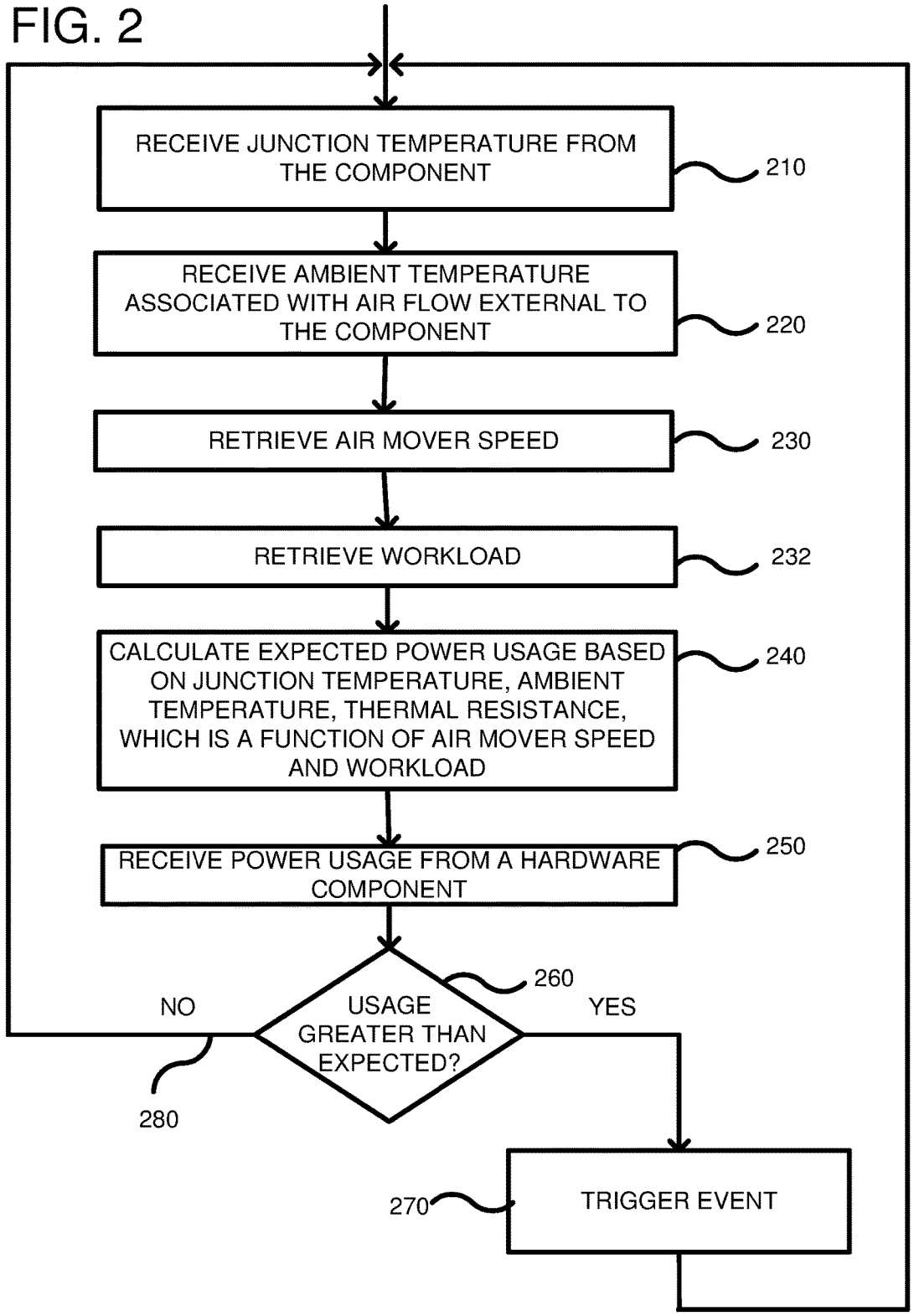
FIG. 2 is a flowchart of a method for predicting failure of a hardware component.

FIG. 2 is a flowchart of a method for predicting failure of a hardware component. At 210, a junction temperature is received from the component. The junction temperature can be computed based on a sensor in close proximity to the semiconductor junction. Alternatively, junction temperature can be estimated using a forward voltage drop at the junction. In either case, the junction temperature can be made available to a management controller either upon request or periodically. At process block 220, an ambient temperature can be received associated with an air flow external to the component. Generally, the ambient temperature is upstream of the hardware component and can be obtained through a temperature sensor, such as a thermocouple. In process block 230, the air mover speed can be retrieved. The air mover speed can be in revolutions per minute or volume per minute and can be controlled by the management controller. Retrieving the air mover speed can be either through retrieving a stored variable or querying the air mover for its current speed. In process block 232, a workload can be retrieved. The workload can be based on a utilization of the hardware component and can be based on operations per second or other utilization metrics, such as traffic flow in Gigabits/second, bus utilization, etc. In process block 240, an expected power usage is calculated based on the junction temperature, ambient temperature, the thermal resistance, which is a function of the air mover speed, and workload, as described above. In one example, the formula defined above can be used to calculate the expected power. In process block 250, the actual power usage can be obtained. Generally, the actual power usage is received from the hardware component itself, which can internally monitor voltage and/or current usage. In decision block 260, a determination is made whether the actual usage is greater than the expected usage. If so, then an event is triggered at 270. The event can include transmitting an indication of a predictive failure. The transmission can be associated with a log entry that is stored at a centralized server computer. After process block 270, the flow can continue by returning to process block 210. If decision block 260 is answered in the negative, then the monitoring of the components continues as shown at 280.

Figure 3:
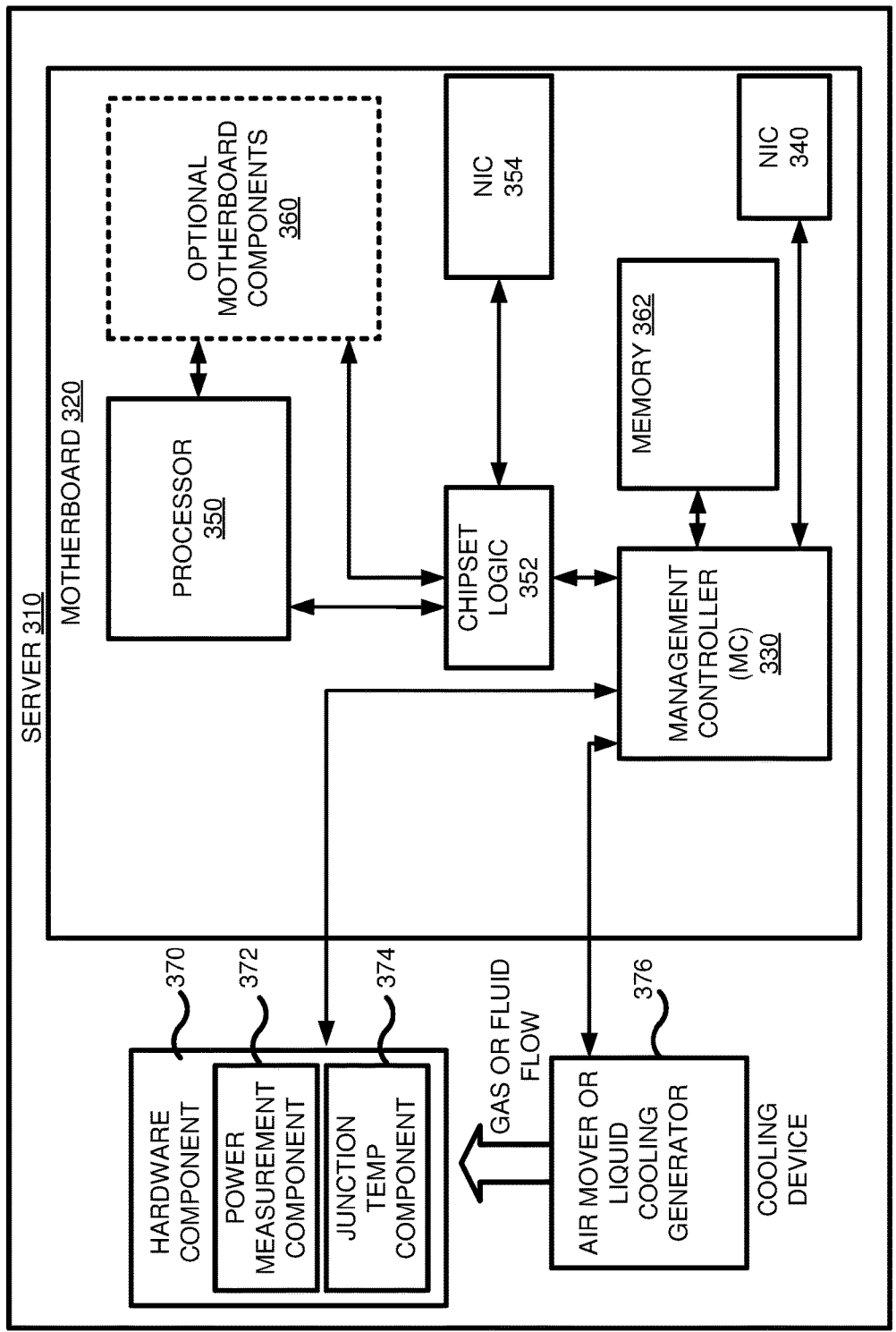
FIG. 3 is an example server computer in which predictive failure analysis is performed.

FIG. 3 shows a server computer 310 having a motherboard 320 therein. The motherboard 320 includes a management controller (MC) 330. In one example, the management controller 330 can be a Baseboard Management Controller (BMC). The management controller 330 can be a processor that monitors state information in the server computer 310 and can transmit the information through an independent connection, which in this case is a Network Interface Card (NIC) 340.

The management controller 340 can communicate with a processor 350 and other motherboard components via chipset logic 352. The chipset logic 352 can be used to manage communications between the processor 350 and other components of the motherboard 320. For example, the chipset logic 352 can include one or more bridges for converting between different signaling protocols. As a specific example, the processor 350 can communicate with the chipset logic 352 using a high-speed front-side bus and a NIC 354 can communicate with the chipset logic 352 using an input/output (IO) protocol, such as peripheral component interconnect (PCI), or PCI-Express. The chipset logic 352 can convert between and manage communications between the different protocols so that the processor 350 can communicate with the NIC 354 through the chipset logic.

The processor 350 and the management controller 330 can operate using a distributed computing model, where the processor 350 and the management controller 330 each have private memory and they can communicate by passing messages to each other. The processor 350 and the management controller 330 can have one or more areas of shared memory where messages and/or data can be passed by writing to the shared memory. Generally, the processor 350 and the management controller 330 have private areas of memory and can execute different programs, such as different operating systems.

Optional motherboard components 360 can include CPUs, GPUs, math or physics co-processors, cryptographic ICs, programmable logic such as field-programmable gate arrays (FPGAs), networking ICs or add-in cards, video cards, sound cards, storage devices, and other various ICs and/or add-in cards that provide computing hardware and/or software capabilities.

The management controller 330 is coupled to a memory 362 that can store instructions or data needed to determine whether there is a predictive failure of a hardware component 370. The hardware component can be silicon, an integrated circuit, or a printed circuit board. Additionally, the hardware component 370 can be separate from or integrated into the motherboard 320. The hardware component 370 includes a power measurement component 372 and can include a junction temperature component 374. The power measurement component 372 can measure a power of the entire hardware component 370, such as by monitoring current and/or voltage at a source where power enters the hardware component. Alternatively, the power measurement component 372 can measure power of a part of the hardware component. The junction temperature component 374 can measure junction temperature either through a temperature sensor or other hardware that estimates temperature, such as by current or voltage measurements. The management controller 330 can receive any of the junction temperature and the power usage through communicating directly or indirectly with the hardware component 370. The management controller can also communicate with a cooling device 376, which can be an air mover or liquid cooling generator. In any case, the cooling device 376 can be a pump that is external to the hardware component 370 and is upstream of the hardware component 370 and can move fluid (gas or liquid) past the hardware component so that it can cool the hardware component in any desired fashion.

Figure 4:
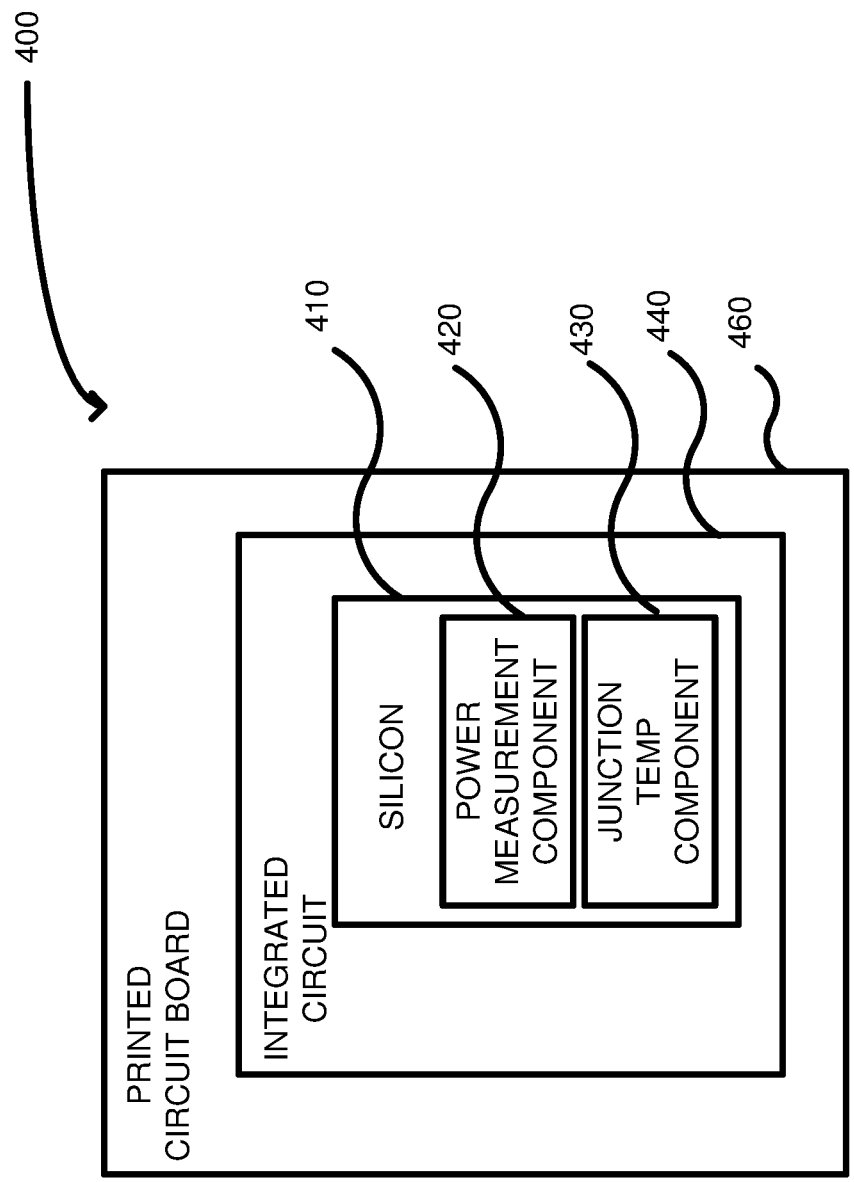
FIG. 4 is an example of different hardware components for which predictive failure analysis can be performed.

FIG. 4 shows different hardware components 400 for which predictive failure analysis can be performed. A first hardware component 410 can be a silicon-based electronic circuit, which can degrade over time. The silicon 410 can include a number of components that can be considered integrated into the silicon or separated therefrom. In particular, a power measurement component 420 can be used to measure power usage consumed by the silicon 410. Different types of power measurement components can be used including those that measure voltage and/or current. Additionally, a junction temperature component 430 can be used to measure one or more junctions within the silicon. The junction temperature component 430 can be a sensor to measure temperature or it can be electronics to measure a forward voltage drop, which can then be used to estimate temperature. The hardware component 400 can also be considered an integrated circuit 440 in which the silicon is positioned. The integrated circuit can include various silicon substrates and metallization layers. The integrated circuit can be packaged in a plastic housing with legs for connecting to a printed circuit board. In this case, the power measurement component 420 can measure power usage of the entire integrated circuit or a part thereof. The junction temperature component 430 can measure one or more junction temperatures in silicon or a temperature at any point in the integrated circuit. In still another embodiment, the hardware component 400 can be a printed circuit board. The printed circuit board 460 can include multiple integrated circuits and the power measurement component can be for measuring power of the entire printed circuit board or one or more of the integrated circuits on the printed circuit board. The silicon 410, integrated circuit 440 and printed circuit board 460 can be positioned at any point within a server computer including being integrated into the motherboard of the server computer, being plugged into the motherboard, or separated from the motherboard.

Figure 5:
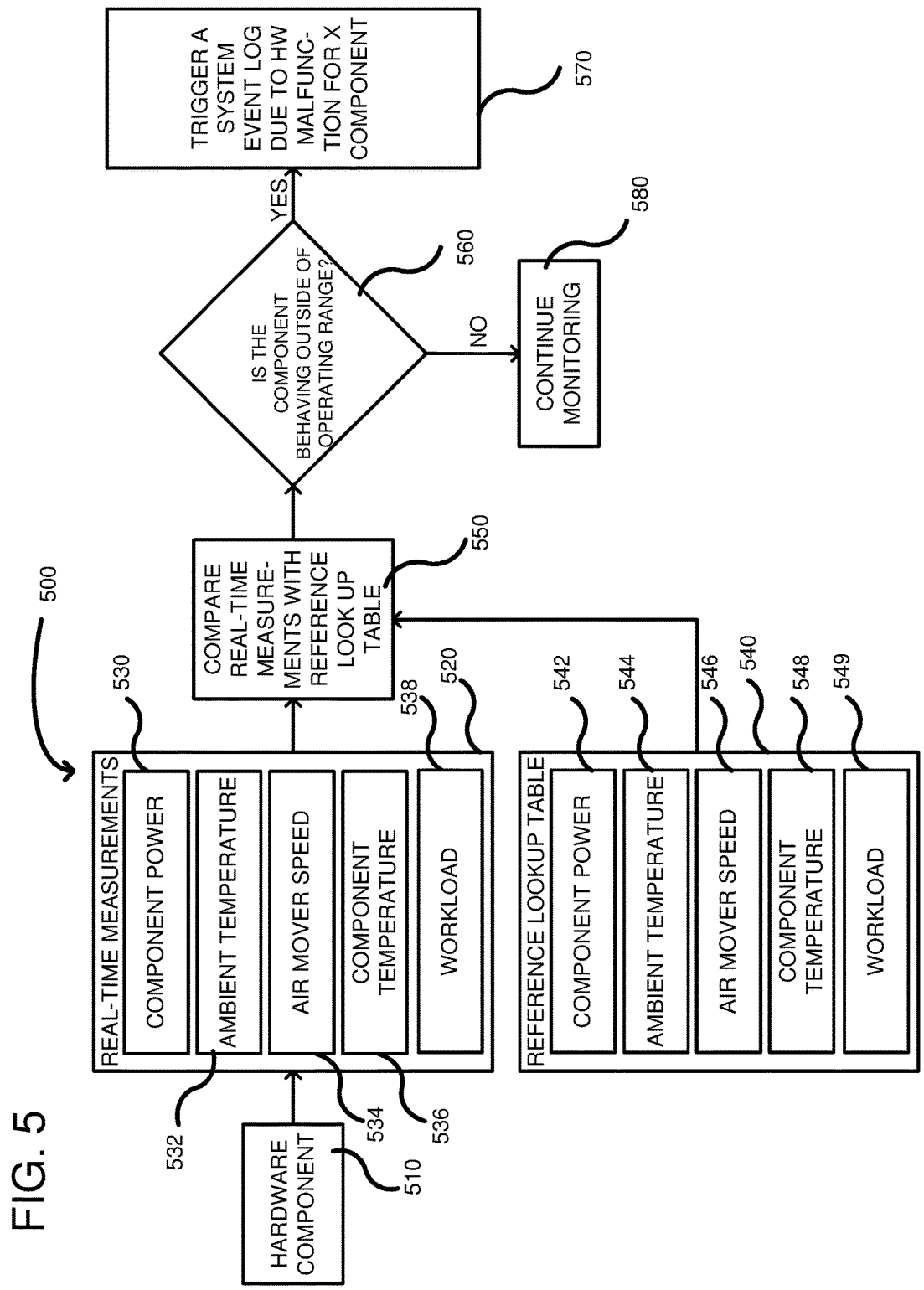
FIG. 5 is an example system diagram according to another embodiment for performing predictive failure analysis.

FIG. 5 shows an alternative embodiment of a system 500 for performing a predictive failure analysis of a hardware component 510. In this embodiment, various parameters can be retrieved using real-time measurements as shown at 520. The real-time measurements include power usage 530 of the hardware component, ambient temperature measurement 532 associated with a temperature external to the hardware component, air mover speed 534 associated with a air mover that is cooling the hardware component 510, a temperature 536 internal to the hardware component 510, and a workload 538 indicative of a utilization of the hardware component. As discussed above, the air mover can be replaced with a liquid coolant and a corresponding cooling parameter can be used in place of air mover speed. A reference lookup table 540 can be stored in memory, such as memory 362 (FIG. 3). The reference lookup table can include predetermined values that can be used for comparison purposes to the real-time measurements 520. For example, a reference component power 542 can be used for comparison against the real-time component power parameter 530. Likewise, the reference lookup table 540 can include an ambient temperature reference 544, an air mover speed 546, a component temperature 548, and previously measured workloads that span a wide range from low utilization to high utilization.

A comparison can be performed as shown at 550. Typically, the management controller 330 is the controller performing the comparison, but other hardware components can be used. The comparison can be a direct comparison whereby the real-time measurement is compared against a maximum threshold value (from the reference lookup table 540) and if the real-time measurement exceeds the threshold value, then decision block 560 is decided in the affirmative and a system log event is triggered (process block 570) indicative a predictive failure of the hardware component. Otherwise, if decision block 560 is decided in the negative, the monitoring is continued in process block 580.

Figure 6:
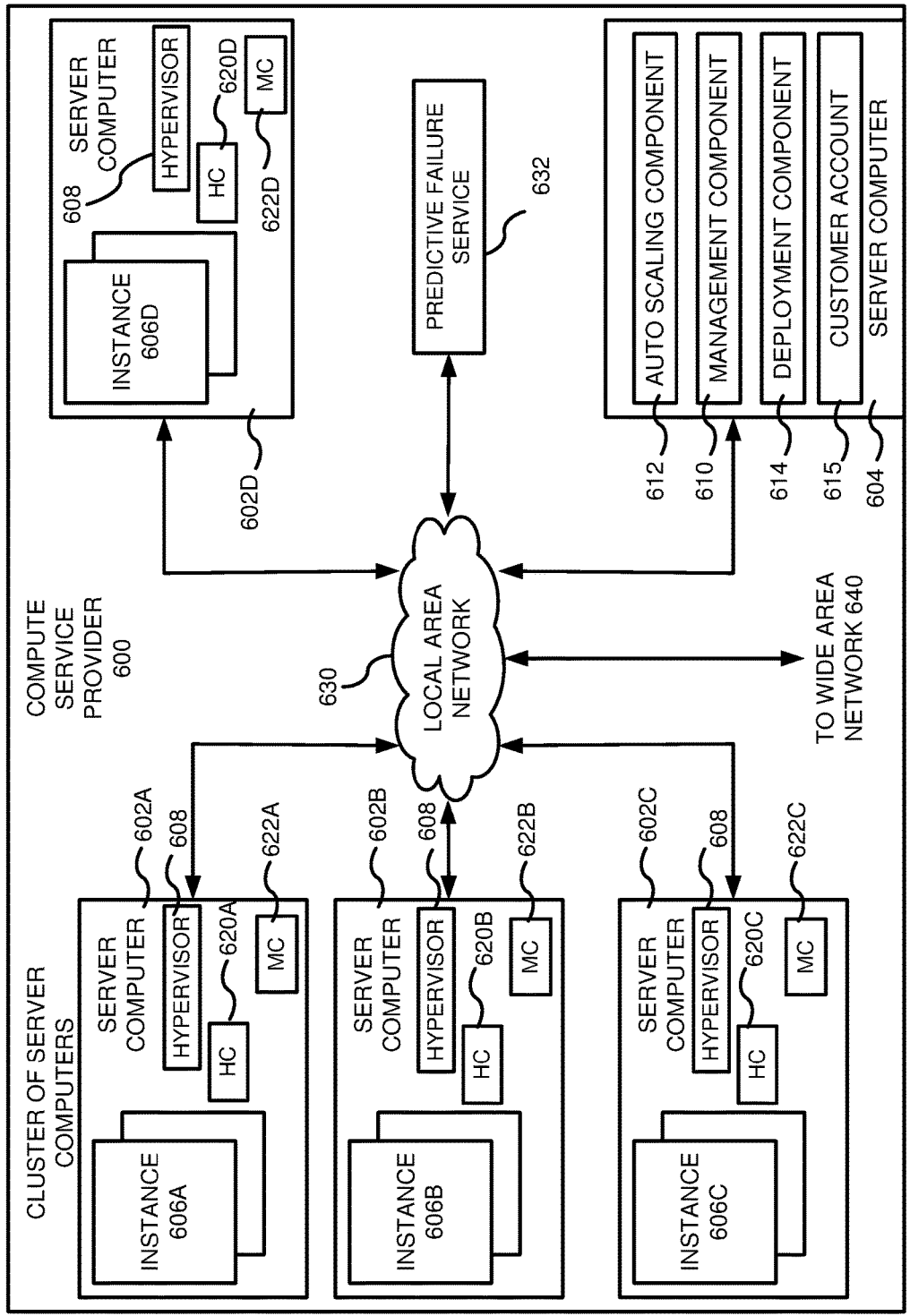
FIG. 6 is an example system diagram showing a plurality of servers in a compute service provider environment, wherein a predictive failure service can be used to monitor hardware components across a system.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications. Each server computer 602A-602D can include one or more hardware components 620A-620D that are being monitored. The hardware components 620A-620D can be similar to those described above. Each server computer 602A-602D can also include a management controller 622A-622D, similar to the management controller shown in FIG. 3, at 330.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

A predictive failure service 632 can be used to gather the predictive failures from each of the management controllers 622A-622D through the local area network 630. Based on data received from the management controllers, the service 632 can determine whether to alert technicians to replace the hardware components. In this way, hardware components in the compute service provider 600 can be monitored to ensure their integrity.

Figure 7:
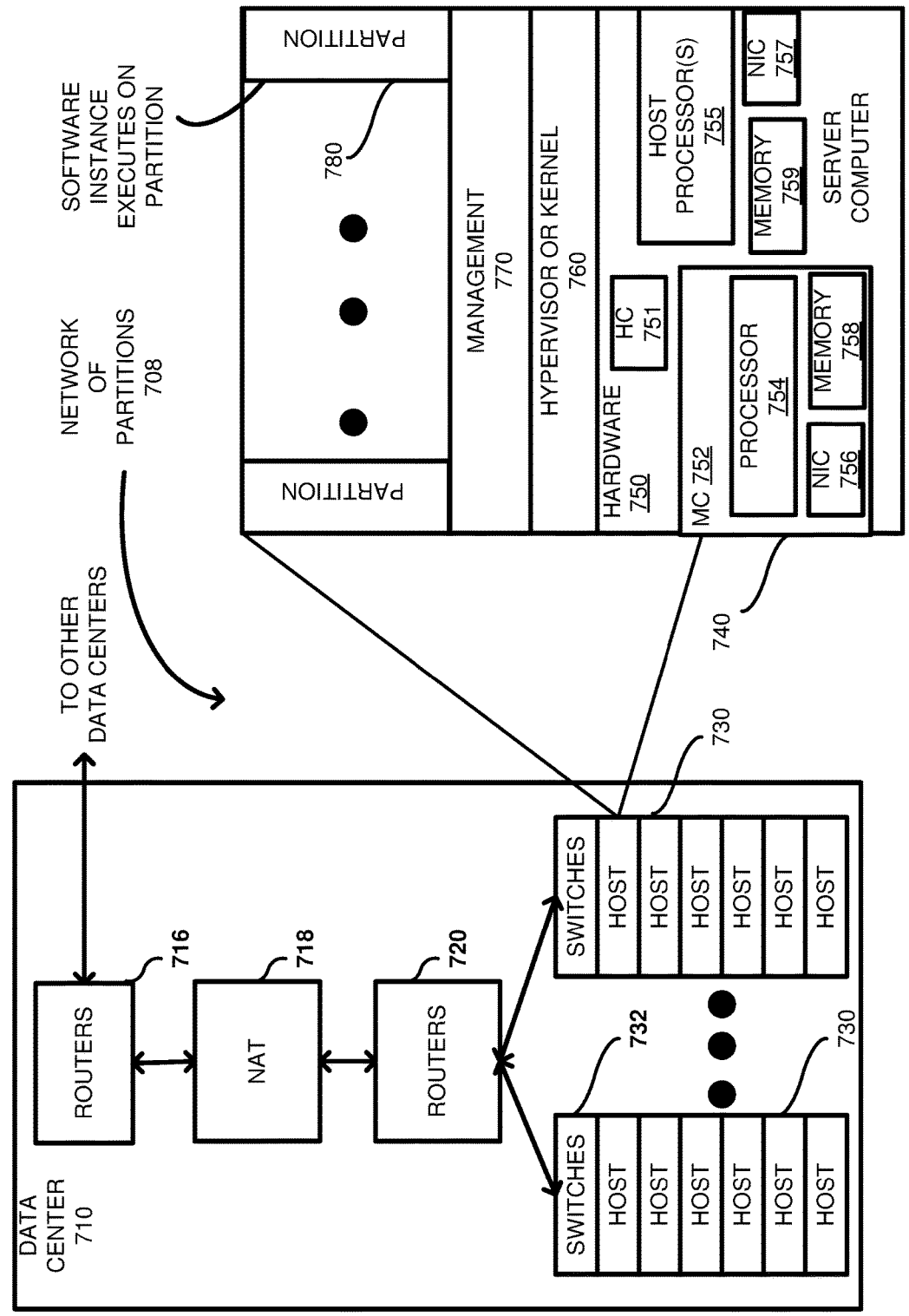
FIG. 7 shows an example of a plurality of host computers, routers and switches, with a server computer having hardware and software used in performing predictive failure analysis.

FIG. 7 illustrates the network of partitions 708 and the physical hardware associated therewith. The network of partitions 708 can include a plurality of data centers, such as data center 710, coupled together by routers 716. The routers 716 read address information in a received packet and determine the packet's destination. If the router decides that a different data center contains a host server computer, then the packet is forwarded to that data center. If the packet is addressed to a host in the data center 710, then it is passed to a network address translator (NAT) 718 that converts the packet's public IP address to a private IP address. The NAT also translates private addresses to public addresses that are bound outside of the data center 710. Additional routers 720 can be coupled to the NAT to route packets to one or more racks of host server computers 730. Each rack 730 can include a switch 732 coupled to multiple host server computers. A particular host server computer is shown in an expanded view at 740.

Each host 740 has underlying hardware 750 including one or more CPUs, memory, storage devices, etc. Running a layer above the hardware 750 is a hypervisor or kernel layer 760. The hypervisor or kernel layer can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 770 can be part of the hypervisor or separated therefrom and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 770, which can then pass the metrics to a service within the compute service provider for storage. Additionally, the management layer 770 can pass the number of instances that are running, when they were launched, the operating system being used, the applications being run, etc.

The hardware layer 750 can further include a management controller 752. The management controller 752 can include a processor 754, a NIC 756 and memory 758. The management controller 752 can monitor real-time parameters within the server 740 including real-time parameters obtained from one or more hardware components 751. Such parameters include a power usage parameter that can be used in determining potential failure of the hardware component. The server computer 740 can further include a host processor 755 having access to its own memory 759 and NIC 757. The host processor 755 can be used by the partitions 780 to execute applications.

Figure 8:
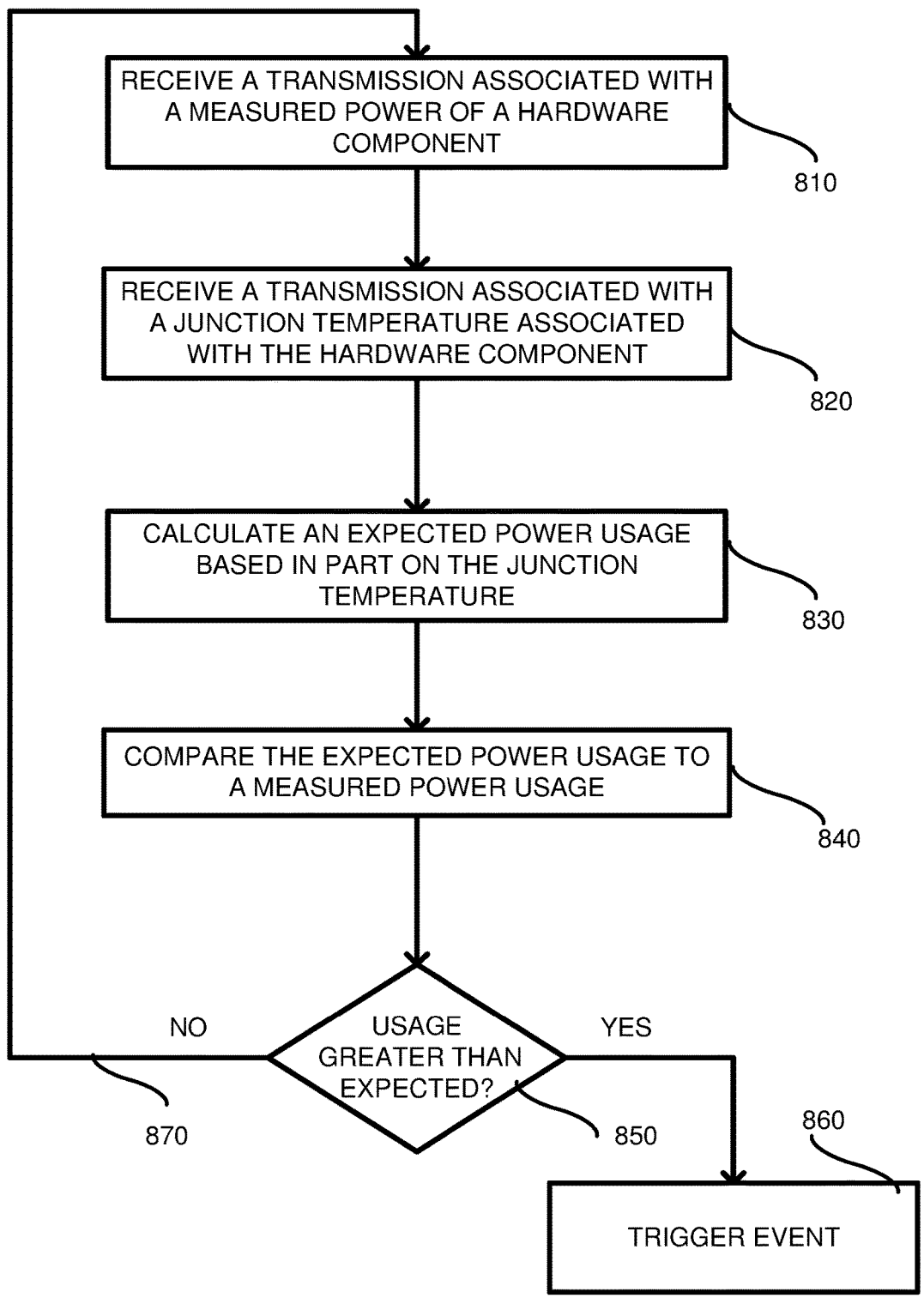
FIG. 8 is a flowchart of a method according to one embodiment for performing predictive failure analysis using a measured power.

FIG. 8 is a flowchart of a method for determining a hardware failure. In process block 810, a transmission is received associated with a measured power of a hardware component. The transmission can, for example, be from the hardware component to the management controller. For example, in FIG. 3, the management controller 330 can request from the hardware component 370 for a power usage obtained from the power measurement component 372. Such a transmission of information can be a push or pull type data exchange. The power usage can be associated with silicon, an integrated circuit (processor, memory or other logic), a printed circuit board, etc. In process block 820, a transmission is received associated with a junction temperature of the hardware component. Again, referring to FIG. 3 as an example, the junction temperature can be received through a request from the management controller 330 to the hardware component 370. The junction temperature component 372 can provide data associated with a junction temperature, which can be temperature data, voltage data, etc. that can be used to derive or determine the junction temperature. In process block 830, an expected power usage is calculated based in part on the junction temperature.

In one example, the following formula can be used to calculate an expected power:

$$P_{expected} = \frac{T_{junction\_meas} - T_{ambient\_meas}}{\Psi_{j-af(RPM)}} \pm P \%$$

$P_{expected}$ is the power that the hardware component should dissipate with the given parameters. The $T_{junction\_meas}$ is the measured junction temperature reported by the hardware component. $T_{ambient\_meas}$ is an ambient air temperature measured upstream of the component. This air temperature could be modified to be related to a flow temperature, such as either air or liquid flow temperature. The P % is a variation expected that is added such that $P_{expected}$ can have a range controlled by the P %.

The following portion of the formula is related to thermal resistance:

$$\Psi_{j-a} = A + B * RPM^{-C}$$

wherein the $\Psi_{j-a}$ is the thermal resistance of the hardware component in question as a function of air mover speed (revolutions per minute). The A, B and C are constants that can be derived or modeled through testing, and depend on the particular design.

In process block 840, the expected power usage is compared to the measured power usage. The management controller can perform such a comparison. If $P_{meas}$ is greater than $P_{expected}$+P % (process block 850), then a system event is triggered (process block 860) indicating a potential degradation of the hardware component due to power exceeding an expected threshold. If the $P_{expected}$-P %<= $P_{meas}$<=$P_{expected}$+P %, then the management controller should continue monitoring and not take action, as shown by arrow 870. If the $P_{meas}$<$P_{expected}$-P %, and $T_{junction\_meas}$>upper threshold, then the management controller can log an event indicating a potential hardware malfunction (process block 860).

Figure 9:
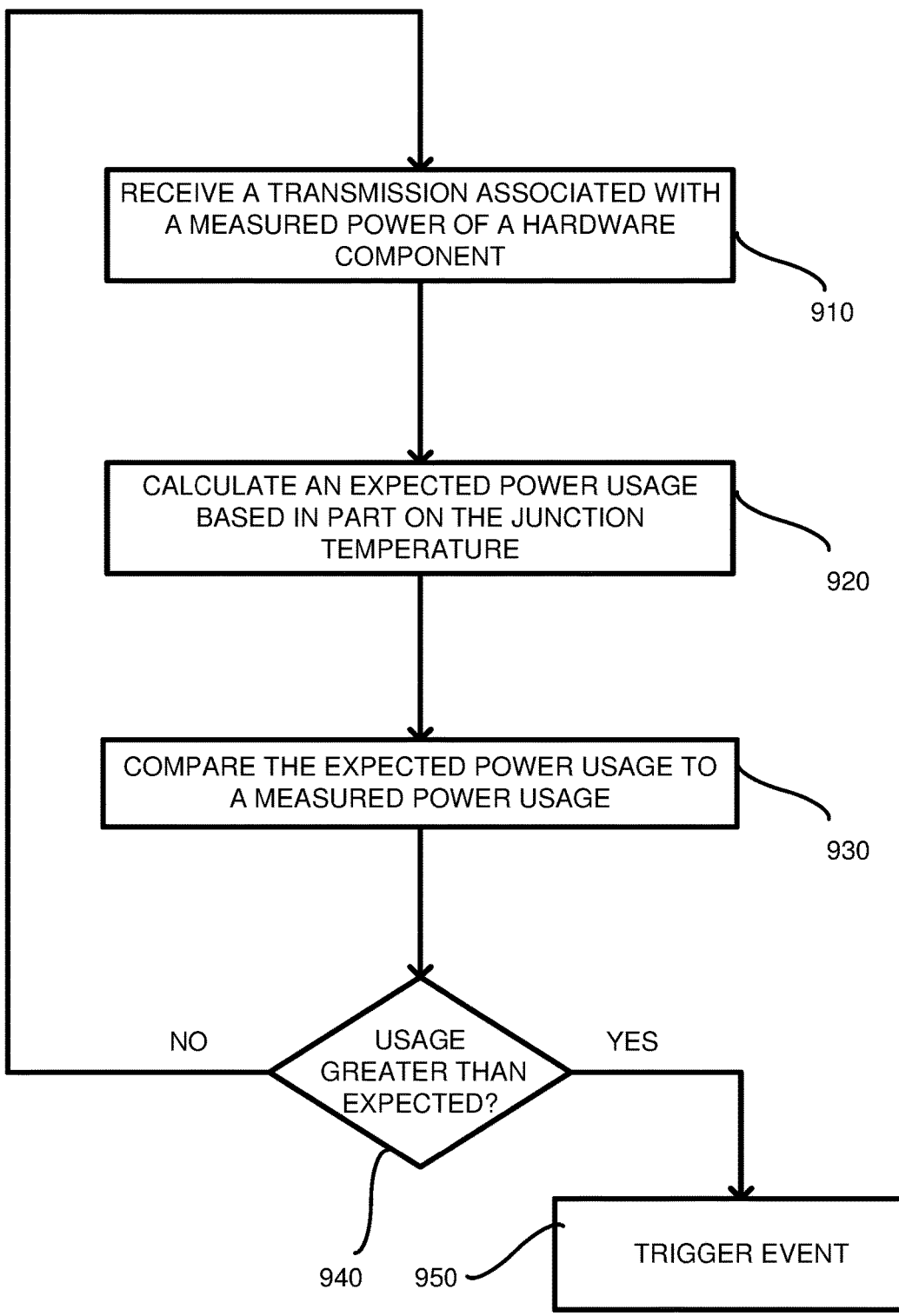
FIG. 9 is a flowchart of a method according to another embodiment for performing predictive failure analysis using a measured power.

FIG. 9 is a flowchart according to another embodiment for predictively determining a hardware failure. In process block 910, a transmission is received that is associated with a measured power of a hardware component. As described above, the measured power can be obtained from the hardware component itself. The hardware component can be silicon, an integrated circuit or a printed circuit board. The transmission can include data associated with power usage of the hardware component. In process block 920, an expected power usage is calculated based in part on the junction temperature. Other real-time data can also be used, such as an ambient air temperature upstream of the hardware component, fluid flow temperature data associated with cooling the hardware component, etc. In process block 930, the expected power usage is compared to the measured power usage. If the usage exceeds the expected usage (decision block 940) by a threshold amount, then in process block 950, an event is triggered, such as by transmitting a predictive failure notification. Such a transmission can be to a predictive failure service, such as is shown at 632 in FIG. 6. If actual usage does not exceed the expected usage, then the monitoring continues.

Figure 10:
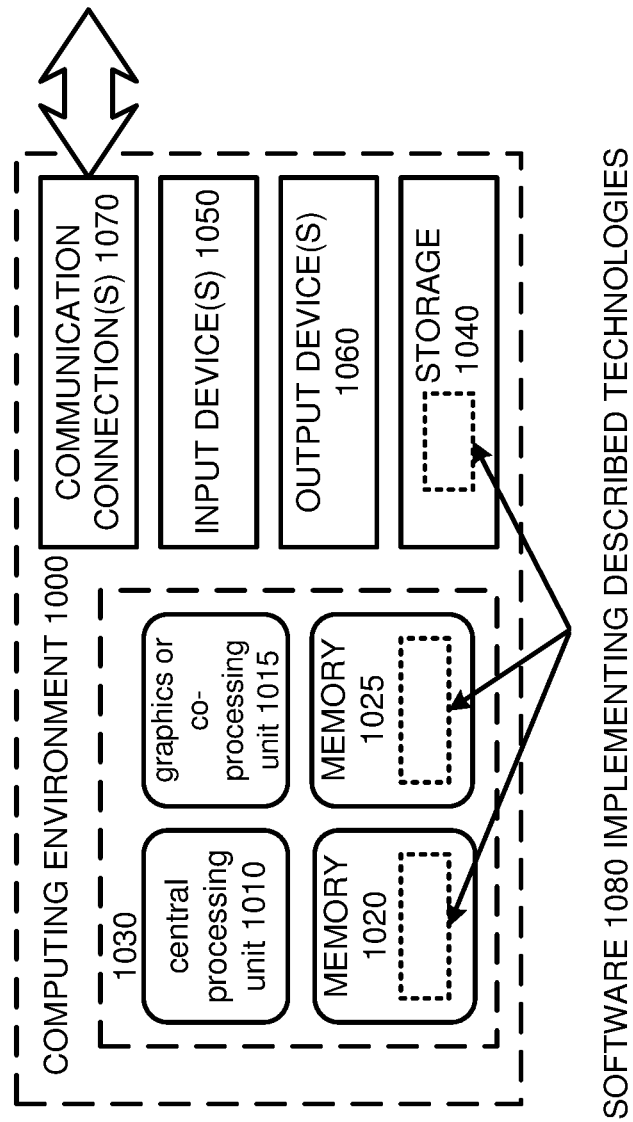
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.). Thus, although FIG. 3 shows a server computer, the embodiments herein can be applied to any of these computing devices and can be applied to the computer environment 1000.

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A computer-readable storage medium including instructions that upon execution cause a computer system to:
   receive, in a management controller, from a hardware component, a measured power usage of the hardware component, wherein the hardware component is an integrated circuit or a printed circuit board including multiple integrated circuits, and wherein the hardware component is within a server computer that includes the management controller;
   receive from the hardware component, a measured junction temperature of the hardware component and an air mover speed;
   calculate an expected power usage based on the junction temperature, and the air mover speed;
   compare the expected power usage to the measured power usage; and
   transmit a predictive failure indication if the measured power usage exceeds the expected power usage by a threshold amount so as to provide notification that the hardware component is failing.

2. The computer-readable storage medium of claim 1, wherein the instructions, upon execution, further cause the computer system to:
   receive an ambient air temperature upstream of the hardware component; and
   calculate the expected power usage based upon the junction temperature and the ambient air temperature.

3. The computer-readable storage medium of claim 1, wherein the hardware component is silicon of an integrated circuit.

4. The computer-readable storage medium of claim 1, wherein the expected power usage is determined using the following formula:

$$\text{Power expected} = (T_{junction\_measured} - T_{ambient\_measured}) / \text{thermal resistance};$$

wherein $T_{junction\_measured}$ is a measured temperature internal to the hardware component, $T_{ambient\_measured}$ is an ambient temperature outside of the hardware component, and the thermal resistance is of the hardware component and wherein the Power expected is calculated for different levels of workload of the hardware component ranging from a low utilization level of the hardware component to a high utilization level.

5. A method of predictively determining a hardware failure, comprising:
   receiving a transmission in a server computer that includes data indicating a measured power usage of a hardware component and a transmission including an air mover speed in the server computer;
   calculating an expected power usage as a function of junction temperature of the hardware component, an ambient temperature upstream of the hardware component, and an air mover speed associated with an air mover used to cool the hardware component;
   comparing the measured power usage of the hardware component to the expected power usage; and
   transmitting a predictive failure notification upon determining that the measured power usage exceeds the expected power by a threshold amount so as to indicate that the hardware component is failing.

6. The method of claim 5, wherein the expected power usage is determined using a lookup table.

7. The method of claim 5, wherein the expected power usage is determined using the following formula:

$$\text{Power expected} = (T_{junction\_measured} - T_{ambient\_measured}) / \text{thermal resistance};$$

wherein $T_{junction\_measured}$ is a measured temperature internal to the hardware component, $T_{ambient\_measured}$ is an ambient temperature outside of the hardware component, and the thermal resistance is of the hardware component, and wherein the Power expected is calculated for different levels of workload ranging from a low utilization level of the hardware component to a high utilization level.

8. The method of claim 7, wherein the thermal resistance is a function of fluid flow that passes the hardware component.

9. The method of claim 8, wherein the fluid flow is associated with the air mover speed or pump speed.

10. The method of claim 5, further including a management controller coupled to the hardware component, the management controller including a processor that receives the transmission including the data indicating the power usage, and that transmits the predictive failure notification.

11. A system, comprising:
   a hardware component having a power measurement sub-component built therein and a junction temperature sub-component built therein, the power measurement sub-component for determining power used by the hardware component, and the junction temperature sub-component for determining a junction temperature;
   a pump that moves fluid past the hardware component, the pump being an air mover or a liquid pump to cool the hardware component; and
   a management controller coupled to the hardware component, the management controller for calculating an expected power usage based on the junction temperature received from the hardware component and based on a measurement received from the pump, and for calculating a difference between the power determined by the power measurement component and the expected power usage, wherein the management controller is for transmitting a predictive failure notification when the difference exceeds a threshold so as to indicate that the hardware component is likely to fail and wherein the management controller is within a server computer and the hardware component is silicon within an integrated circuit.

12. The system of claim 11, wherein the management controller is a baseboard management controller (BMC) on a server motherboard.

13. The system of claim 11, further including an ambient temperature component to measure ambient temperature associated with the hardware component, wherein the management controller is coupled to the ambient temperature component and calculates the expected power usage based on the ambient temperature.

* * * * *